(12) United States Patent
Lin et al.

(10) Patent No.: US 10,566,877 B2
(45) Date of Patent: *Feb. 18, 2020

(54) METHOD AND ASSEMBLY OF A POWER GENERATION SYSTEM

(71) Applicant: GE AVIATION SYSTEMS LLC, Grand Rapids, MI (US)

(72) Inventors: Lanchao Lin, Dayton, OH (US); Hao Huang, Troy, OH (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,767

(22) Filed: Dec. 21, 2018

(65) Prior Publication Data

US 2019/0149018 A1    May 16, 2019

Related U.S. Application Data

(62) Division of application No. 15/051,990, filed on Feb. 24, 2016, now Pat. No. 10,199,907.

(51) Int. Cl.
*H02K 9/20* (2006.01)
*H02K 9/19* (2006.01)
*F28D 15/02* (2006.01)

(52) U.S. Cl.
CPC .............. *H02K 9/20* (2013.01); *H02K 9/19* (2013.01); *F28D 15/02* (2013.01)

(58) Field of Classification Search
CPC ........ H02K 9/19; H02K 9/20; F28D 15/0283; F28D 15/0275; F28D 15/0266; F28D 15/0233; F28D 2015/0291
USPC ......... 29/596, 598, 890.032; 310/54, 57, 61, 310/64; 174/DIG. 19, DIG. 32
See application file for complete search history.

(56) References Cited

U.S. PATENT DOCUMENTS

| | | | |
|---|---|---|---|
| 3,801,843 A | 4/1974 | Corman et al. | |
| 4,921,041 A | 5/1990 | Akachi | |
| 5,097,241 A | 3/1992 | Smith | |
| 5,219,020 A | 6/1993 | Akachi | |
| 5,240,069 A | 8/1993 | Yerkes | |
| 5,283,488 A | 2/1994 | Ponnappan et al. | |
| 5,629,573 A | 5/1997 | Ponnappan et al. | |
| 6,672,373 B2 | 1/2004 | Smymov | |
| 6,768,278 B2 | 7/2004 | Xu | |
| 6,897,581 B2 | 5/2005 | Doherty | |
| 7,443,066 B2 | 10/2008 | Salamah | |
| 7,823,374 B2 * | 11/2010 | Venkataramani | F02C 7/047 60/226.1 |
| 8,247,943 B2 | 8/2012 | Prucher | |
| 8,410,647 B2 | 4/2013 | Garriga et al. | |
| 8,985,517 B2 | 3/2015 | Ehinger et al. | |
| 9,124,144 B2 | 9/2015 | Prucher | |

(Continued)

*Primary Examiner* — Burton S Mullins
(74) *Attorney, Agent, or Firm* — McGarry Bair, P.C.

(57) ABSTRACT

A wet cavity electric machine includes a stator core having stator poles formed by a post and a wire wound about the post to form a stator winding, with the stator winding having end turns, a rotor having two rotor poles and configured to rotate relative to the stator and a channel for liquid coolant to flow through the rotor to at least one nozzle, and liquid coolant sprays from the at least one nozzle at least a portion of the stator windings.

20 Claims, 7 Drawing Sheets

(56) References Cited

U.S. PATENT DOCUMENTS 10,199,907 B2 * 2/2019 Lin .................. H02K 9/20
2013/0133871 A1 5/2013 Ma

* cited by examiner

METHOD AND ASSEMBLY OF A POWER GENERATION SYSTEM

CROSS-REFERENCE TO RELATED APPLICATION

This application is a division of U.S. application Ser. No. 15/051,990, filed on Feb. 24, 2016, titled "METHOD AND ASSEMBLY OF A POWER GENERATION SYSTEM", which is hereby expressly incorporated herein by reference in its entirety.

BACKGROUND OF THE INVENTION

Contemporary aircraft engines include electric machines, or generator systems, which utilize a running aircraft engine in a generator mode to provide electrical energy to power systems and components on the aircraft. Some aircraft engines can further include starter/generator (S/G) systems, which act as a motor to start an aircraft engine, and as a generator to provide electrical energy to power systems on the aircraft after the engine is running. Motors and generators can be wet cavity systems, wherein a cavity housing the rotor and stator is exposed to liquid coolant, or dry cavity systems, wherein the cavity is not exposed to liquid coolant. Dry cavity systems can also utilize liquid coolant in one or more contained cooling systems, but they are still considered dry cavity so long as the cavity is not exposed to liquid coolant. Both contemporary types of wet or dry cavity systems have respective advantages. For example, dry cavity systems generally have less losses, higher efficiency, higher reliability, less required maintenance, and attitude independence over wet cavity systems. In contrast, the power density of a wet cavity electric machine can be considerably higher than that of a dry cavity electric machine due to its higher cooling effectiveness.

The operating requirements or the operating environment of a generator system can increase the cooling requirements for either a wet cavity or dry cavity system. For example, generator systems proximate to the high temperature environment of a turbine engine can further include an external cooling jacket surrounding the stator or generator, whereby the cooling jacket exposes the outer surface of the stator to coolant traversing a cooling jacket. The addition of cooling systems typically increases the costs, complexity, and adds to the weight and size requirements of the generator system.

BRIEF DESCRIPTION OF THE INVENTION

In one aspect, a wet cavity electric machine includes a stator core having at least two stator poles formed by a set of stator windings, with the stator winding having end turns, a rotor having at least two rotor poles, and configured to rotate relative to the stator core, and having a channel for liquid coolant to flow through the rotor to at least one nozzle, at least one oscillating heat pipe having an evaporator portion extending through the set of stator windings and a condenser portion extending outside the set of stator windings proximate to the at least one nozzle, and a working fluid in the at least one oscillating heat pipe, wherein the working fluid is disposed in alternating liquid and vapor phases in the at least one oscillating heat pipe. Liquid coolant from the at least one nozzle can be sprayed onto the condenser portion of the at least one oscillating heat pipe to cause the working fluid to oscillate and extract heat from the stator core In another aspect, a power generation system includes a wet cavity machine comprising, a stator core having a set of teeth and a set of stator poles formed a wire wound about the set of teeth to form a set of stator windings, with the set of stator windings having end turns, a rotor having two rotor poles and configured to rotate relative to the stator core, and having channel for liquid coolant to flow through the rotor to at least one nozzle, at least one oscillating heat pipe having an evaporator portion extending through the stator winding and a condenser portion extending outside the stator winding proximate to the at least one nozzle to be exposed to liquid coolant passing through the at least one nozzle, and a working fluid in the at least one oscillating heat pipe. The exposure of the condenser portion to liquid coolant will extract enough heat from the wet cavity machine to enable the power generation system to operate within predetermined parameters free of cooling systems external to the wet cavity machine.

In yet another aspect, a method of assembling a stator core includes closing one end of at least one oscillating heat pipe, filling the at least one oscillating heat pipe with a working fluid in alternating phases to a predetermined ratio of fluid volume to total volume, closing another end of the at least one oscillating heat pipe, inserting the filled at least one oscillating heat pipe into a stator core, and wiring a set of windings into the stator core in a two-pole configuration wherein the set of windings surrounds only an evaporator portion of the at least one oscillating heat pipe, leaving a condenser portion exposed to a nozzle in a rotor.

DESCRIPTION OF EMBODIMENTS OF THE INVENTION

Embodiments of the invention can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, embodiments of the invention are applicable in any environment using an electric machine. Thus, a brief summary of a contemplated environment should aid in a more complete understanding.

Figure 1:
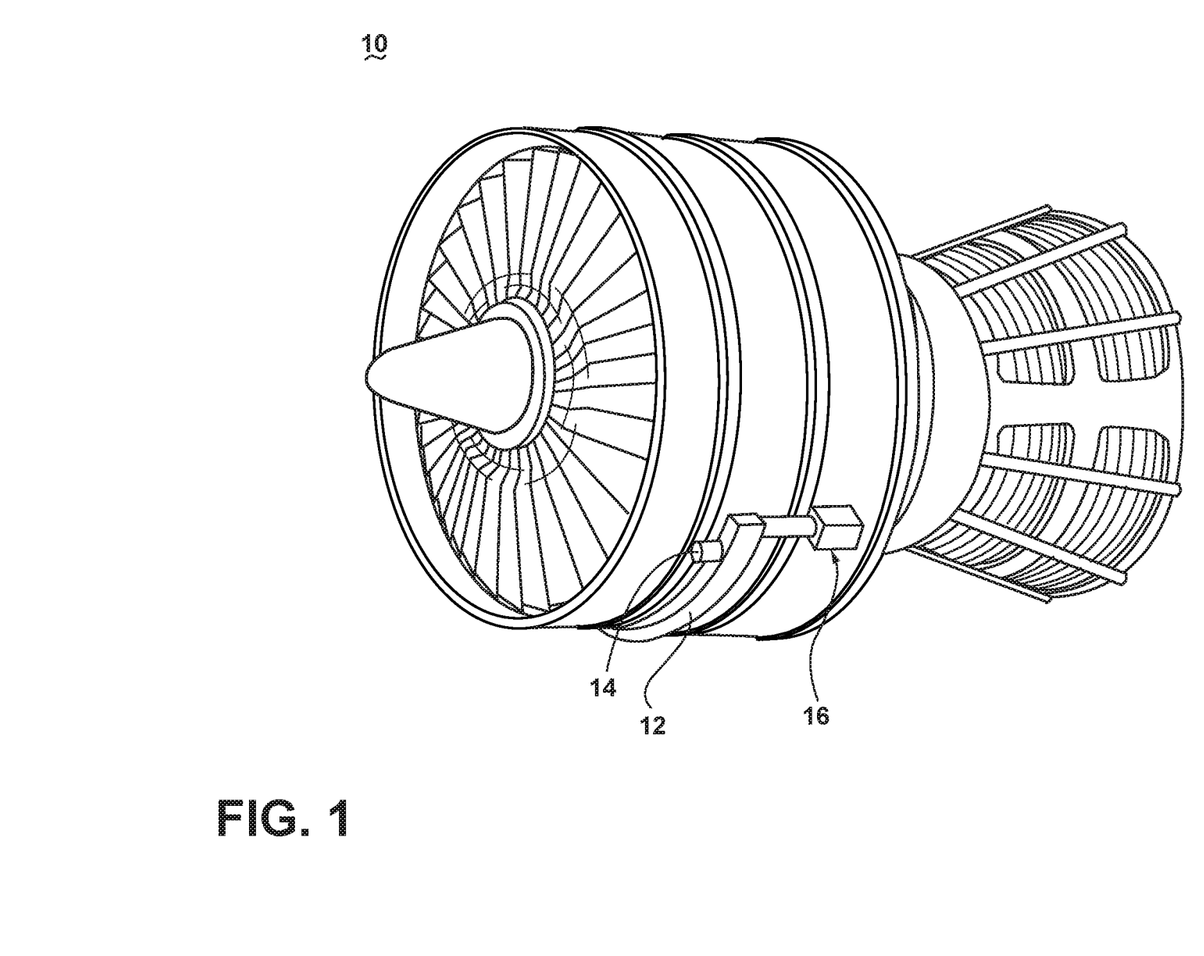
FIG. 1 is a perspective view of a gas turbine engine having a starter/generator (S/G) according to an embodiment of the invention.

FIG. 1 illustrates a gas turbine engine 10 having an accessory gear box (AGB) 12 and a starter/generator (S/G) 14 according to an embodiment of the invention. The gas turbine engine 10 can be a turbofan engine, such as a General Electric GEnx or CF6 series engine, commonly used in modern commercial and military aviation or it could be a variety of other known gas turbine engines such as a turboprop or turboshaft. The gas turbine engine 10 can also have an afterburner that burns an additional amount of fuel downstream of the low pressure turbine region to increase the velocity of the exhausted gases, and thereby to increase thrust. The AGB 12 can be coupled to a turbine shaft (not shown) of the gas turbine engine 10 by way of a mechanical power take off 16. The gas turbine engine 10 can be any suitable gas turbine engine used in modern commercial and military aviation or it could be a variety of other known gas turbine engines such as a turboprop or turboshaft. The type and specifics of the gas turbine engine 10 are not germane to the invention and will not be described further herein. While an S/G 14 is shown and described, embodiments of the disclosure can include any electrical machine or generator, and are not limited to generator embodiments that can provide starting functionality.

Figure 2:
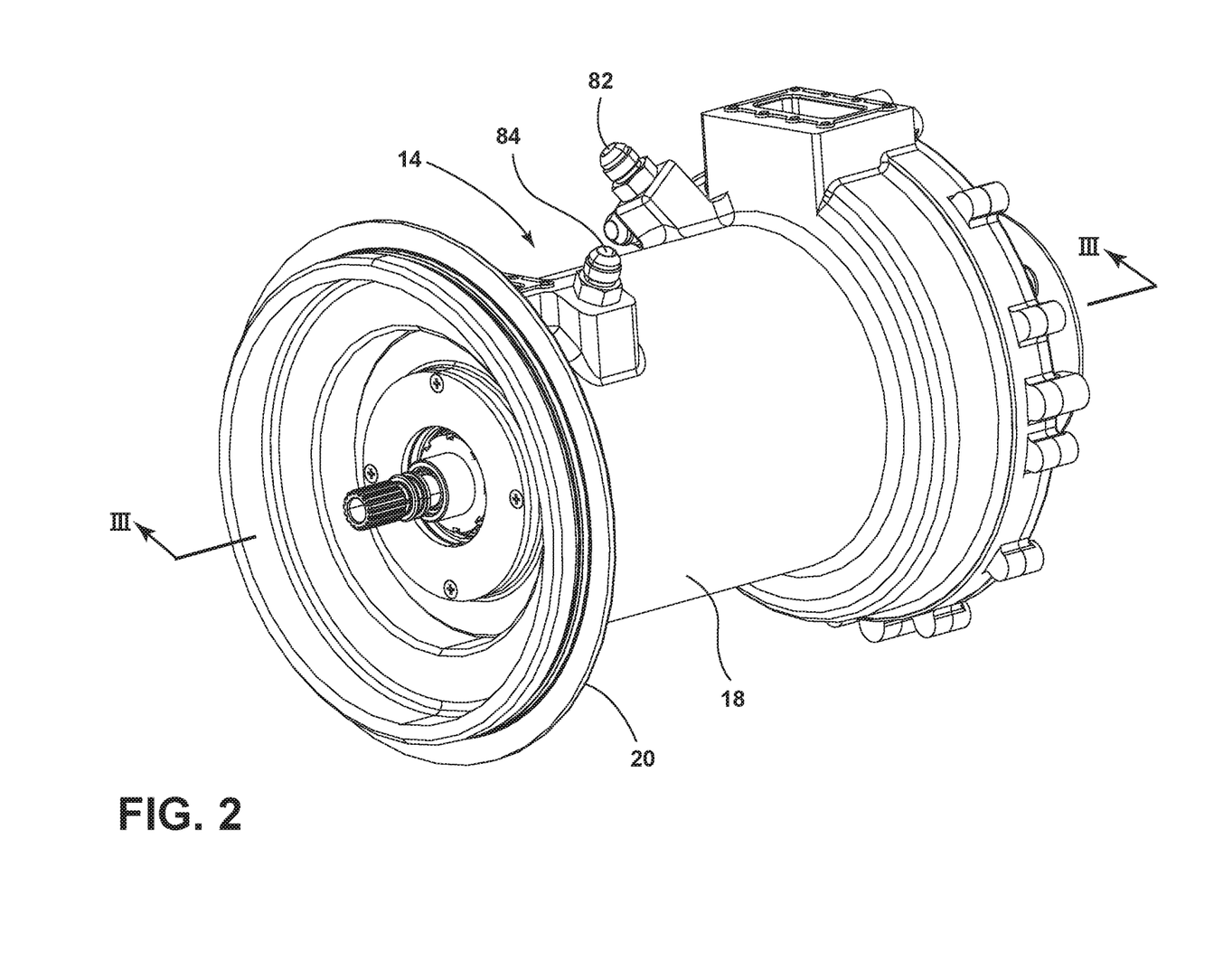
FIG. 2 is a perspective view of an exterior of the generator of FIG. 1, in accordance with embodiments of the disclosure.

FIG. 2 more clearly illustrates the S/G 14 and its housing 18, which can include a clamping interface 20, used to clamp the S/G 14 to the AGB 12. Multiple electrical connections can be provided on the exterior of the S/G 14 to provide for the transfer of electrical power to and from the S/G 14. The electrical connections can be further connected by cables to an electrical power distribution node of an aircraft having the gas turbine engine 10 to power various items on the aircraft, such as lights and seat-back monitors. The S/G 14 includes a liquid coolant system for cooling or dissipating heat generated by components of the S/G 14 or by components proximate to the S/G 14, one non-limiting example of which can be the gas turbine engine 10. For example, the S/G 14 can include a liquid cooling system using oil as a coolant. The liquid cooling system can include a cooling fluid inlet port 82 and a cooling fluid outlet port 84 for controlling the supply of coolant to the S/G 14. While not shown, embodiments of the disclosure can further include other liquid cooling system components, such as a liquid coolant reservoir fluidly coupled with the cooling fluid inlet port 82 and cooling fluid outlet port 84, and a liquid coolant pump to forcibly supply the coolant through the ports 82, 84 or S/G 14. Oil is merely one non-limiting example of a liquid coolant that can be used in embodiments of the disclosure.

Figure 3:
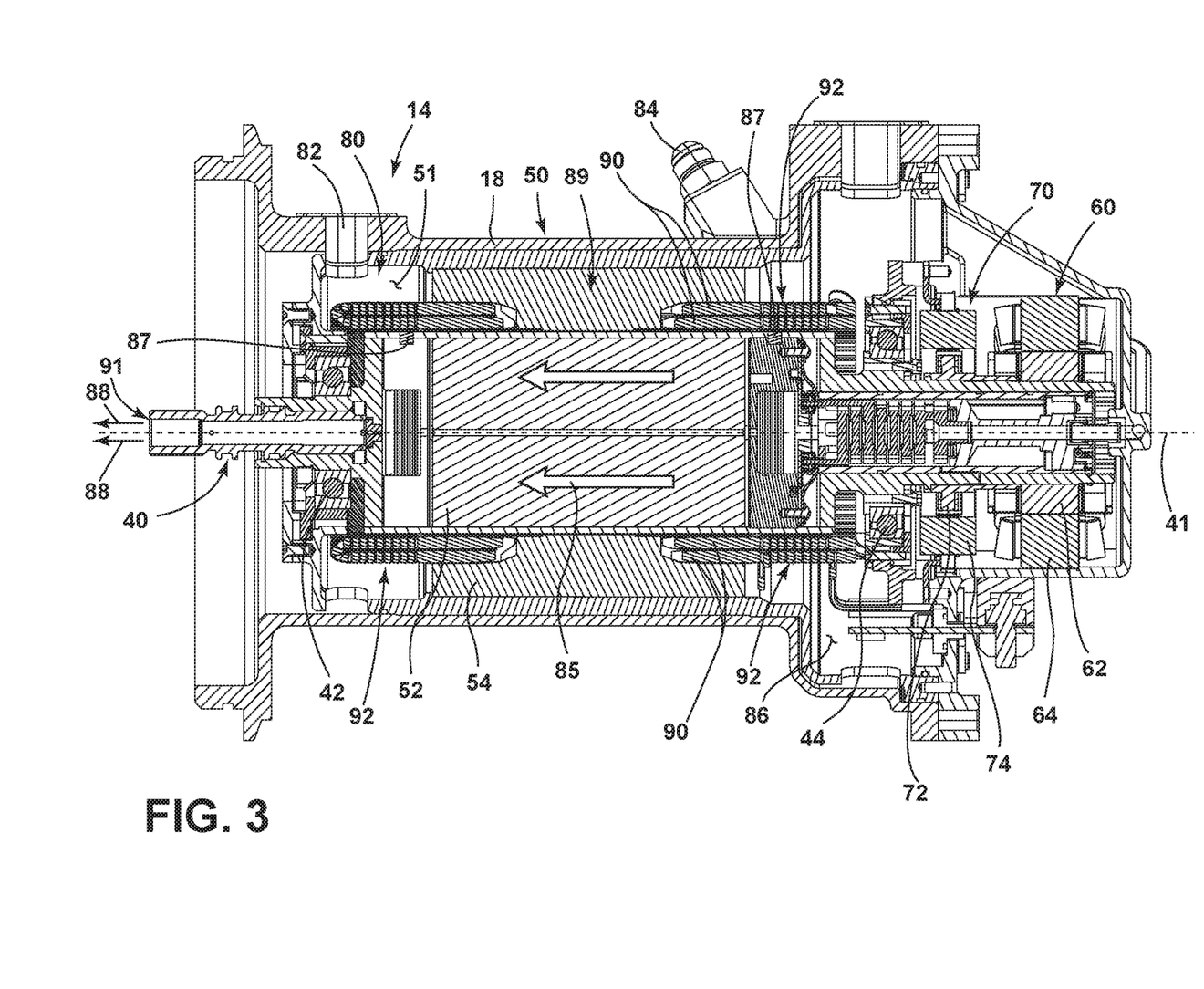
FIG. 3 is a schematic cross-sectional view of the S/G, taken along line of FIG. 2, in accordance with embodiments of the disclosure.

The interior of the S/G 14 is best seen in FIG. 3, which is a sectional view of the S/G 14 shown in FIG. 2. A rotatable shaft 40 is located within the S/G 14 and is the primary structure for supporting a variety of components. The rotatable shaft 40 can have a single diameter or one that can vary along its length. The rotatable shaft 40 is supported by spaced bearings 42 and 44 and configured to rotate about axis of rotation 41. Several of the elements of the S/G 14 have a fixed component and a rotating component, with the rotating component being provided on the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on the rotatable shaft 40. The fixed components can be mounted to any suitable part of the housing 18. The main machine stator 54, exciter stator 64, and PMG stator 74 define an interior through which the rotatable shaft 40 extends.

It will be understood that the main machine rotor 52, exciter rotor 62, and PMG rotor 72 can have a set of rotor poles, including, but not limited to two rotor poles, and that the main machine stator 54, exciter stator 64, and PMG stator 74 can have a set of stator teeth or stator poles, including, but not limited to two stator teeth or stator poles. The set of rotor poles can generate a set of magnetic fields relative to the set of stator poles, such that the S/G 14 can operate through the interaction of the magnetic fields and current-carrying conductors to generate force or electrical power. The exciter 60 can provide direct current to the main machine 50 and the main machine 50 and PMG 70 can supply AC electrical power when the rotatable shaft 40 rotates.

At least one of the rotor poles and stator teeth or stator poles can be formed by a core with a post and wire wound about the post to form a winding, with the winding having at least one end turn. Embodiments of the disclosure shown include at least one set of stator windings 90 arranged longitudinally along the stator housing 18, that is, in parallel with housing 18 and the rotor axis of rotation 41. The set of stator windings 90 can also include a set of stator winding end turns 92 extending axially beyond opposing ends of a longitudinal length of a main machine stator 54.

The components of the S/G 14 can be any combination of known generators. For example, the main machine 50 can be either a synchronous or asynchronous generator. In addition to the accessories shown in this embodiment, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the S/G 14 can be oil cooled and thus can include a cooling system 80. The cooling oil can be used to dissipate heat generated by the electrical and mechanical functions of the S/G 14. The cooling system 80 using oil can also provide for lubrication of the S/G 14. In the illustrated embodiment, the S/G 14 can be a liquid cooled, wet cavity system having the cooling system 80 illustrated as including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more flow channels or paths (shown as arrows 85) for the main machine rotor 52, exciter rotor 62, and PMG rotor 72, as well as an rotor shaft oil outlet 88, such as an outlet port 91, wherein residual, unused, or unspent oil can be discharged from the rotatable shaft 40.

As shown, the main machine rotor 52 can further include at least one fluid port 87, illustrated as two axially spaced (e.g. along the longitudinal axis of the main machine rotor 52) fluid ports 87 such as a spray nozzle, in fluid communication with the one or more flow channels 85 and configured to expose at least a portion of the main machine cavity 51 to the coolant passing though the channels 85. For example, as the rotatable shaft 40 rotates, the at least one fluid port 87 can be rotated about the shaft 40 such that cooling fluid traversing the flow channels 85 can be exposed, sprayed, or otherwise deposited through the at least one fluid port 87 into the cavity 51, such as onto the set of stator windings 90, set of stator winding end turns 92, or onto alternative or additional components proximate to the rotational path of the fluid port 87.

Figure 4:
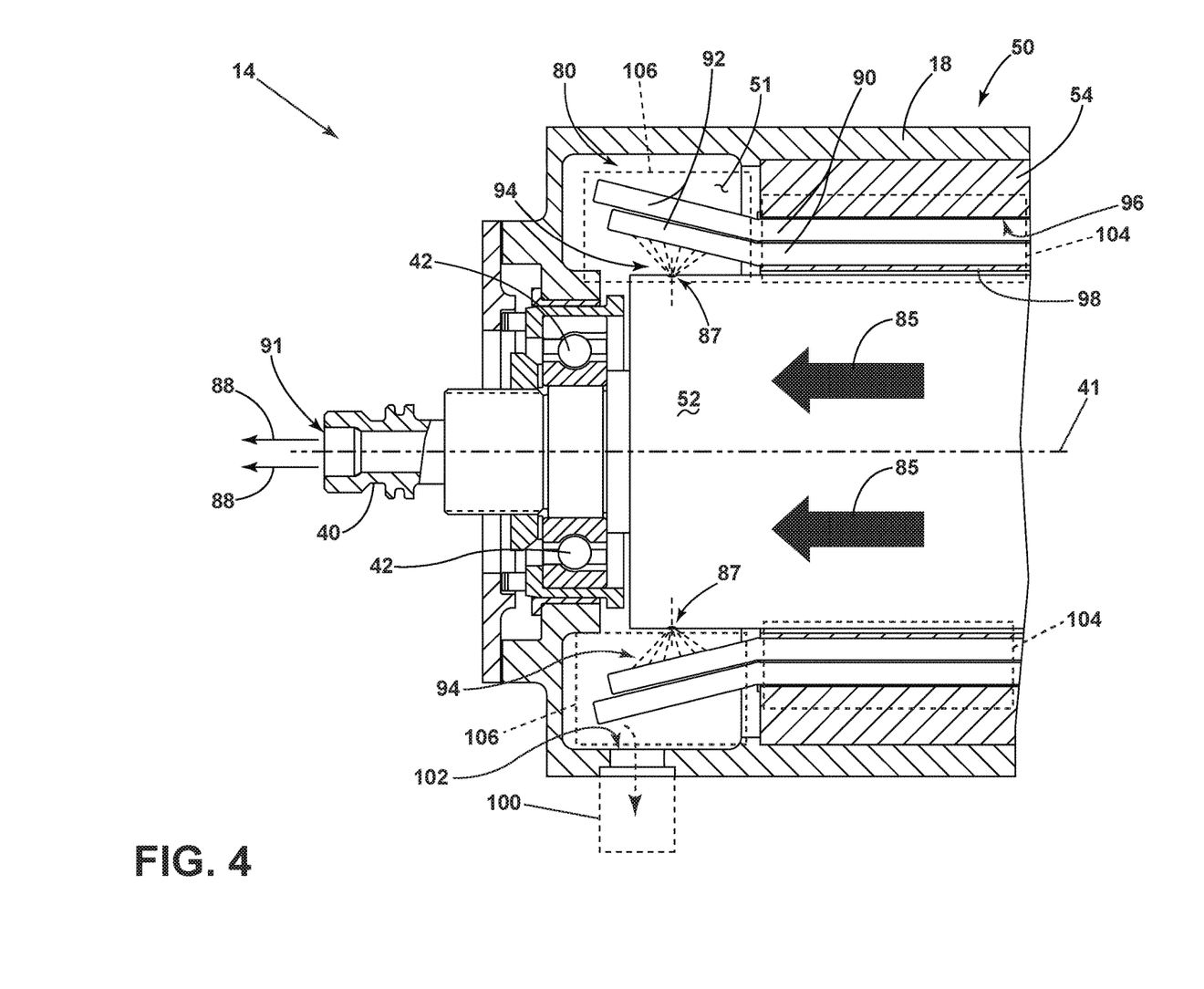
FIG. 4 is a zoomed view of the S/G of FIG. 3, illustrating the operation of a cooling system, in accordance with embodiments of the disclosure.

FIG. 4 illustrates a zoomed view of the S/G 14 for better understanding of the operation and effect of the cooling system 80. As shown, the set of stator winding end turns 92 are fixedly located proximate to the rotating fluid ports 87 or accessible to liquid droplets dispersed from the ports 87 of the main machine rotor 52 such that cooling fluid traversing the flow channels 85 can be exposed, sprayed, or otherwise deposited through the at least one fluid port 87 into the cavity 51, such as onto the windings 90, winding end turns 92, or onto alternative or additional components proximate to the rotational path of the fluid port 87. In the illustrated embodiment, the exposure, spray, or depositing has been illustrated as a schematic spray stream 94 or spray of droplets onto the set of stator winding end turns 92.

The embodiment illustrated also demonstrates that more than one set of stator windings 90 can be wound about the main machine stator 54. As shown, at least two sets of stator windings 90 can be embedded, installed, or wound about a set of stator core slots 96 separated by an alternating set of stator core teeth 98 or stator core posts, wherein the at least two sets of stator windings 90 can be stacked or layered in the stator core slots 96. Embodiments of the set of stator windings 90 can include an external layer of electrically insulating material (not shown) to electrically isolate the set of stator windings 90 from another set of stator windings 90 and the main machine stator core 54. The illustrated embodiment further demonstrates an S/G 14 that includes an optional scavenge device 100 fluidly connected with the main machine cavity 51, for example, at a bottom fluid exit port 102. The scavenge device 100 can be configured to collect or receive used or discharged liquid coolant. The scavenge device 100 can further be configured to strain, clean, purify, or otherwise ready the collected or received liquid coolant for reuse in the cooling system 80, as needed. Alternatively, the scavenge device 100, an additional scavenge device 100, can be fluidly connected with the rotor shaft oil outlet 88 or the shaft outlet port 91.

Collectively, the length of the set of stator windings 90 within the main machine stator 54, that is, embedded, installed, or wound in stator core slots 96 between stator core teeth 98 can define an "evaporator portion" 104 of the set of stator windings 90. Conversely, the length of the set of stator winding end turns 92, that is, the length of stator windings 90 extending axially past the main machine stator 54 (e.g. past the longitudinal ends of the main machine stator 54), can collectively define a "condenser portion" 106 of the set of stator windings 90. In this sense, the condenser portion 160 includes a set of the stator winding end turns 92.

In a wet cavity generator, the cooling fluid is permitted to directly contact, or be directly exposed to components in the main machine cavity 51, such as the main machine stator 54, or main machine rotor 52. This wet cavity approach increases the power density of the wet cavity S/G 14 due to its higher cooling effectiveness.

A problem with prior wet cavity approaches is that while the at least one fluid port 87 can be utilized to dissipate or remove heat from components in the main machine cavity 51 proximate to the port 87 or accessible to the liquid droplets 94, components spaced from the liquid droplets generated by at least one fluid port 87, for example, the axial center 89 of the main machine stator 54 which are spaced from the spray stream 94 coming from either illustrated fluid port 87, can retain unwanted heat, resulting in reduced S/G 14 performance or output. Unwanted heat can be caused by, for example, stator core losses due to hysteresis or eddy currents generated during S/G 14 operations. Conventional generators can address this problem by including a low thermal conductive layer (e.g. approximately 0.12 Watts per degree Celsius-meter; "W/mC") between the stator and stator windings to thermally conduct a small portion of heat away from the stator to the windings, while an external cooling jacket thermally conducts the majority of heat away from the stator. A conventional external cooling jacket includes coolant passages encircling at least a portion of the main machine stator 54, wherein the jacket coolant passages are fluidly coupled with a liquid coolant source, such as the channel 85. The liquid coolant traversing the cooling jacket provides cooling to ensure desired S/G 14 operation, but the addition of cooling systems increases the costs, complexity, and adds to the weight and size requirements of the generator system.

The embodiments of the disclosure provide an alternative solution to address cooling problem of at least the main machine stator 54 by using a specialized configuration of main machine stator windings 90 including at least one oscillating heat pipe having the evaporator portion 104 and the condenser portion 106 to increase the main machine stator 54 cooling capability over contemporary embodiments. Since embodiments of the disclosure significantly increase the main machine stator 54 cooling capability, the S/G 14 can be designed or operated without, or free of, additional cooling systems external to the S/G 14, other than the cooling system 80 (e.g. channel 85, fluid ports 87, coolant pump, or coolant reservoir 86) described above. Stated another way, embodiments of the disclosure provide for a wet cavity S/G 14 wherein the system can be designed or operated without, or free of, at least an external liquid cooling jacket such that the system provides cooling greater than or equal to a predetermined level, wherein the predetermined level is based on an external liquid cooling jacket.

In contrast, contemporary stator end turns and windings are insulated with very low thermal conductivity materials causing a majority of the heat losses including the heat losses in the windings and end turns to go through the rotor and stator cores to reach the cooling system 80. For exemplary purposes, the remainder of this application will focus on the stator portion of the main machine 50; however, it will be understood that the following explanation can also be applied to the stator and rotor portions of the exciter 60, the PMG 70, and the main machine 50.

Figure 5:
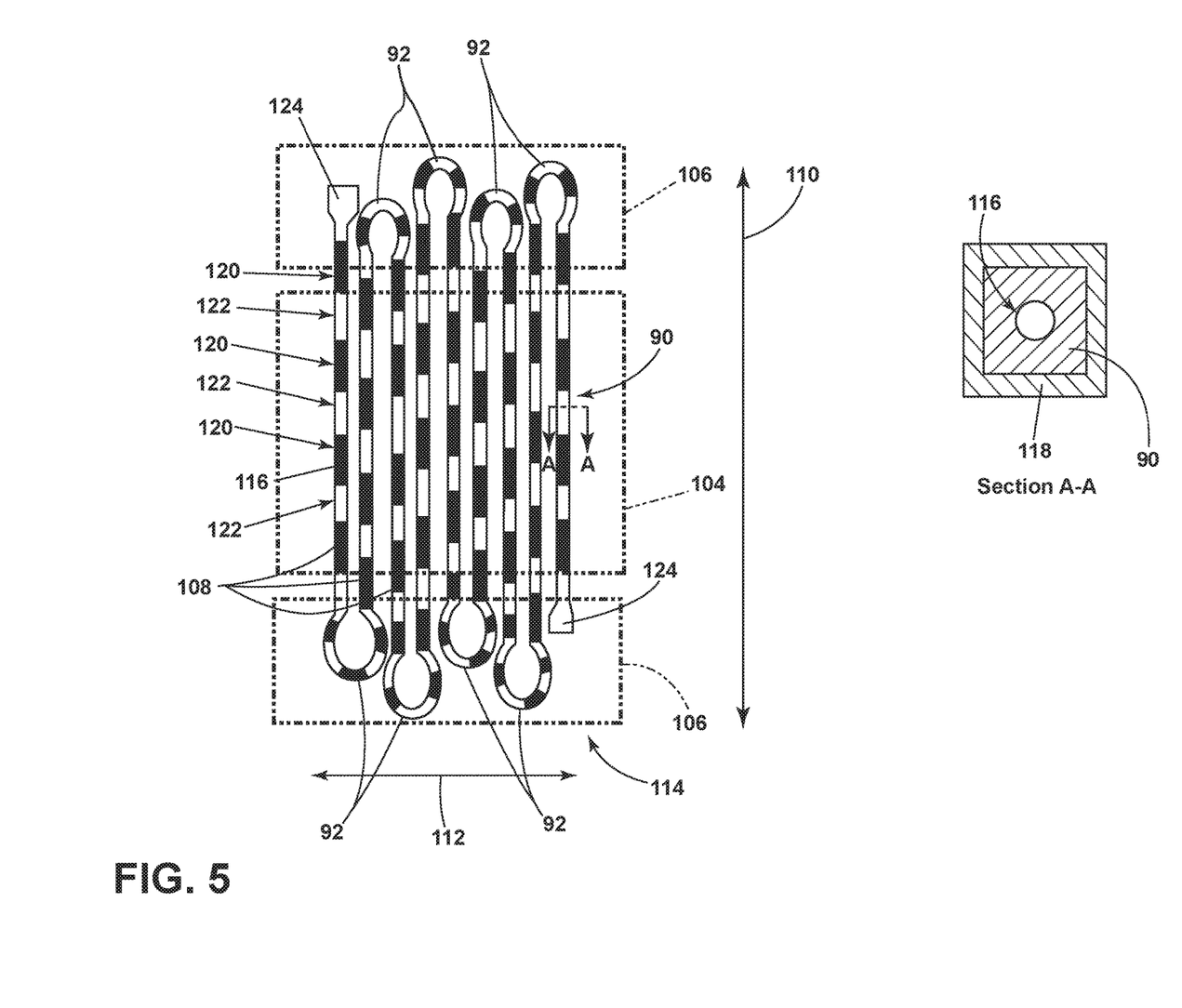
FIG. 5 is a schematic view of the set of stator windings of the S/G of FIG. 1, in accordance with embodiments of the disclosure.

FIG. 5 illustrates a simplified schematic view of a set of stator windings 90 laid flat, showing the evaporator portion 104 of the set of stator windings 90 and the condenser portions 106 of the set of stator windings 90 including the set of stator winding end turns 92. As illustrated, the set of stator windings 90 can includes a set of evaporator winding segments 108, that is, a straight or substantially straightened portion of the set of stator windings 90 relative to the evaporator portion 104. In this sense, the set of windings 90 is shown sequentially or serially arranged along a first direction 110, parallel with the straight evaporator winding segments 108, and along a second direction 112, normal to the first direction 110. In the simplified schematic view, the main machine stator 54 has been removed for ease of understanding operation and functionality of embodiments of the disclosure. Additionally, while the simplified schematic view illustrates a sequential arrangement of the set of stator windings 90, set of stator winding end turns 92, or evaporator winding segments 108 for ease of understanding, embodiments of the disclosure can be included wherein the set of stator windings 90 are wound in alternative winding patterns, including non-sequential overlapping winding patterns, relative to the first direction 110 or the second direction 112. The alternative winding patterns will not alter the cooling functions of the set of stator windings 90, or the methods for assembling or operating the same.

The set of stator windings 90 can include or define at least one continuous oscillating heat pipe 114 extending through or having at least one evaporator winding segment 108 and at least one stator winding end turn 92 located in the condenser portion 106. For example, the set of stator windings 90 can include a conductive winding having a fluid channel disposed throughout the length of the windings 90. In one example embodiment of the disclosure, illustrated by cross-sectional view A-A in FIG. 5, the set of stator windings 90 can include the oscillating heat pipe 114, wherein the stator windings 90 have a substantially square or quadrilateral cross section having a working liquid or fluid channel 116. Cross-sectional view A-A also illustrates a layer of electrically insulating material 118 external to the set of stator windings 90, to electrically isolate the set of stator windings 90 from another set of stator windings 90 and the main machine stator core 54, as explained above.

While a substantially square stator winding 90 cross section is illustrated, any geometric cross section can be included in embodiments of the disclosure, including by not limited to circular, ovate, rectangular, and the like. Similarly, while only a single working liquid channel 116 is illustrated in the cross-sectional view A-A, embodiments of the disclosure can include a set of fluidly isolated working liquid channels 116 in a single set of stator windings 90. For example, a single ovate or rectangular cross section of the set of stator windings 90 can include parallel or dual working liquid channels 116. In one non-limiting example embodiment of the set of stator windings 90, the working liquid channel 166 can be 1.0 millimeter to 2.0 millimeters in diameter.

The working liquid channel 116 of the set of windings 90 can be arranged, configured, filled, or disposed with a working liquid or fluid (illustrated as dark portions 120). In non-limiting example embodiments, the filling or disposing of the working liquid 120 in the working channel 116 can include alternating the working liquid 116 along the length of the set of windings 90 with empty space, or with liquid vapor portions 122. In this sense, the oscillating heat pipe 114 of the set of windings 90 can include alternating working liquid portions 120 and liquid vapor portions 122, or liquid and vapor phases along the length of the windings 90, including the set of evaporator winding segments 108 and the set of stator winding end turns 92. Non-limiting example embodiments of the working liquid 120 can include water, or substantially aqueous solutions or mixtures. Further non-limiting example embodiments can be included wherein the fill ratio, that is, the working liquid 120 volume divided by the total volume of the working liquid channel 116) is between 15 to 60 percent.

As shown, the set of windings 90 can be closed at opposing winding ends 124, for instance, by way of pinching, sealing, or soldering the working liquid channel 116 closed. In this sense, the working liquid channel 116 is sealed at both opposing winding ends 124 for a particular length of stator windings 90. While not shown, the set of stator windings 90 are electrically connected to a power output for the S/G 14.

Figure 6:
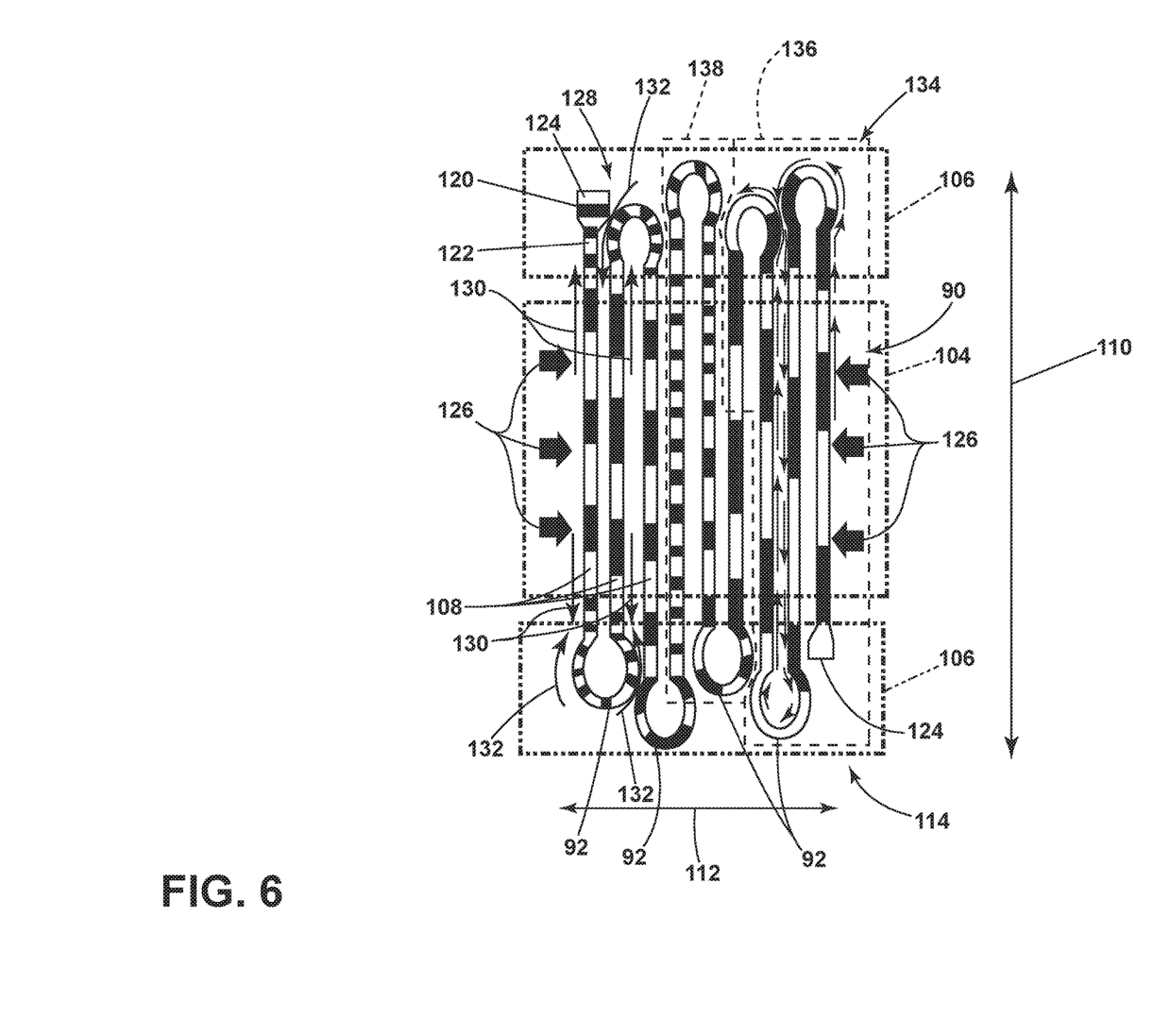
FIG. 6 is a schematic view of the oscillating heat pipe heat transfer of the set of stator windings of FIG. 5, in accordance with embodiments of the disclosure

FIG. 6 illustrates the operation of the oscillating heat pipe 114 and set of stator windings 90 during power-generating operations of the S/G 14. During power-generating operations, the rotation of the main machine rotor 52 relative to the main machine stator 54 induces or generates current in the main machine stator windings 90, which is further provided to a generator power outlet, which it can be supplied to power or energize a set of electrical loads. During the generation of current in the set of stator windings 90, the stator windings 90 will generate heat due to heat losses, copper losses, resistive losses, winding losses, or the like, as the current traverses the resistive windings 90. In addition to the winding losses, the main machine stator 54 can generate or retain unwanted heat due to, for example, stator core losses due to hysteresis or eddy currents, as explained herein. The main machine stator 54 heat can be generated or retained away from the axial ends of the stator 54, where the cooling system 80 is arranged to provide cooling to the set of stator winding end turns 92.

The main machine stator 54 heat, as explained above, can be generated or retained proximate to the evaporator portion 104 or the set of evaporator winding segments 108 of the set of stator windings 90. In this sense, the main machine stator heat (illustrated as arrows 126) can be conductively transferred to the set of evaporator winding segments 108 of the stator windings 90. The main machine stator heat 126, as well as the winding losses heat, will be absorbed, for example through conduction, into the working liquid 120 and the vapor 122 of the working liquid channel 116.

In a first example portion 128 of the oscillating heat pipe 114 operation, the absorption of heat 126 in the working liquid 120 and vapor 122 will cause at least the vapor 122 pressure to increase, or at least a portion of the working liquid 120 to evaporate to increase the vapor 122 pressure. The increase in vapor 122 pressure, in turn pushes, forces, or drives proximate working liquid 120 and vapor 122 segments away from the heat absorbing portions of the set of stator windings 90 in the evaporator portion 104. The movement of the working liquid 120 and vapor 122 of the heat pipe is illustrated as a first movement arrow 130.

A least one effect of the first movement arrow is that "hot" working liquid 120 and vapor 122, having been heated from at least the main machine stator heat 126, is naturally pushed, forced, or driven along the evaporator winding segment 108 or the first direction, away from the center of the evaporator portion 104, toward the opposing condenser portions 106 and the set of stator winding end turns 92. As explained above, the set of stator winding end turns 92 in the condenser portion 106 are cooled by way of the cooling system 80, whereby the exposure of the oil from the fluid ports 87 to dissipate or remove heat from the end turns 92. The removal of heat from the set of stator winding end turns 92 also removes heat from the working liquid 120 and vapor 122 of the working liquid channel 116, and consequently, condenses at least a portion of the vapor 122 back to working liquid 120, lowering or reducing the vapor pressure of the "cooled" working liquid 120 and vapor 122.

As additional main machine stator heat 126 is absorbed in the set of evaporator winding segments 108 of the evaporator portion 104, the increasing vapor pressure push, force, or drive the "hot" or heated working liquid 120 and vapor 122 into the condensing portion 106. The pushing of the "hot" material in turn pushes the "cooled" working liquid 120 and vapor 122 of the set of stator winding end turns 92 back into an adjacent set of evaporator winding segment 108 or evaporator portion 104 (illustrated as a second movement arrow 132), and the heating and cooling cycle repeats.

While the heating and cooling cycle of the first example portion 128 demonstrates a cycle primarily experienced in the first direction 110, additional heating and cooling cycles can be included. For example, a second example portion 134 illustrates wherein an extended "hot" portion 136 of working liquid 120 and vapor 122 has, by way of vapor pressure, pushed, forced, or driven along a sequential or serial set of evaporator winding segments 108 and set of stator winding end turns 92, resulting in a corresponding extended "cool" portion 138 of working liquid 120 and vapor 122. In this sense, the heating and cooling cycle of the second example portion 134 demonstrates locally-extended portions of "hot" and "cooled" materials, wherein the heating and cooling cycles are experienced in both the first direction 110 and the second direction 112.

The heating and cooling cycles of the first and second example portions 128, 134 demonstrate a self-excited oscillation movement of the two-phase flow (i.e. between working liquid 120 and vapor 122) to effectively transfer, remove, or extract heat generated in the evaporator portion 104 or the main machine stator 54 to the opposing condenser portions 106, wherein the heat is removed by the cooling system 80, as explained herein. The extraction of heat generated in the evaporator portion 104 of the main machine stator 54 enables the S/G 14 to operate within predetermined parameters free of cooling systems external to the wet cavity machine, such as the cooling jacket, as explained herein. In one non-limiting example embodiment of the disclosure, the self-excited oscillation movement can be reliably self-regulating to ensure the heat is removed from the main machine stator 54 as-needed or on-demand (e.g. as it is generated). In another non-limiting example embodiment, at least a minimum number of evaporator winding segments 108 or stator winding end turns 92 can be included to ensure the heat is removed from the main machine stator 54 as-needed or on-demand. For example, in one non-limiting example, a minimum number of evaporator winding segments 108 or stator winding end turns 92 can be ten. In another non-limiting embodiment of the disclosure, the above-described configurations can effectively remove, extract, or transfer over 6000 thermal Watts of stator heat from a wet cavity S/G 14 rated at 150 kiloVolt-Amps or higher without encountering heat transfer limits. In yet another non-limiting embodiment of the disclosure, the above-described configurations can be utilized in an S/G 14 achieving a power density greater than 2.0 kiloVolt-Amps per pound of weight or 4.4 kiloVolt-Amps per kilogram of weight.

Figure 7:
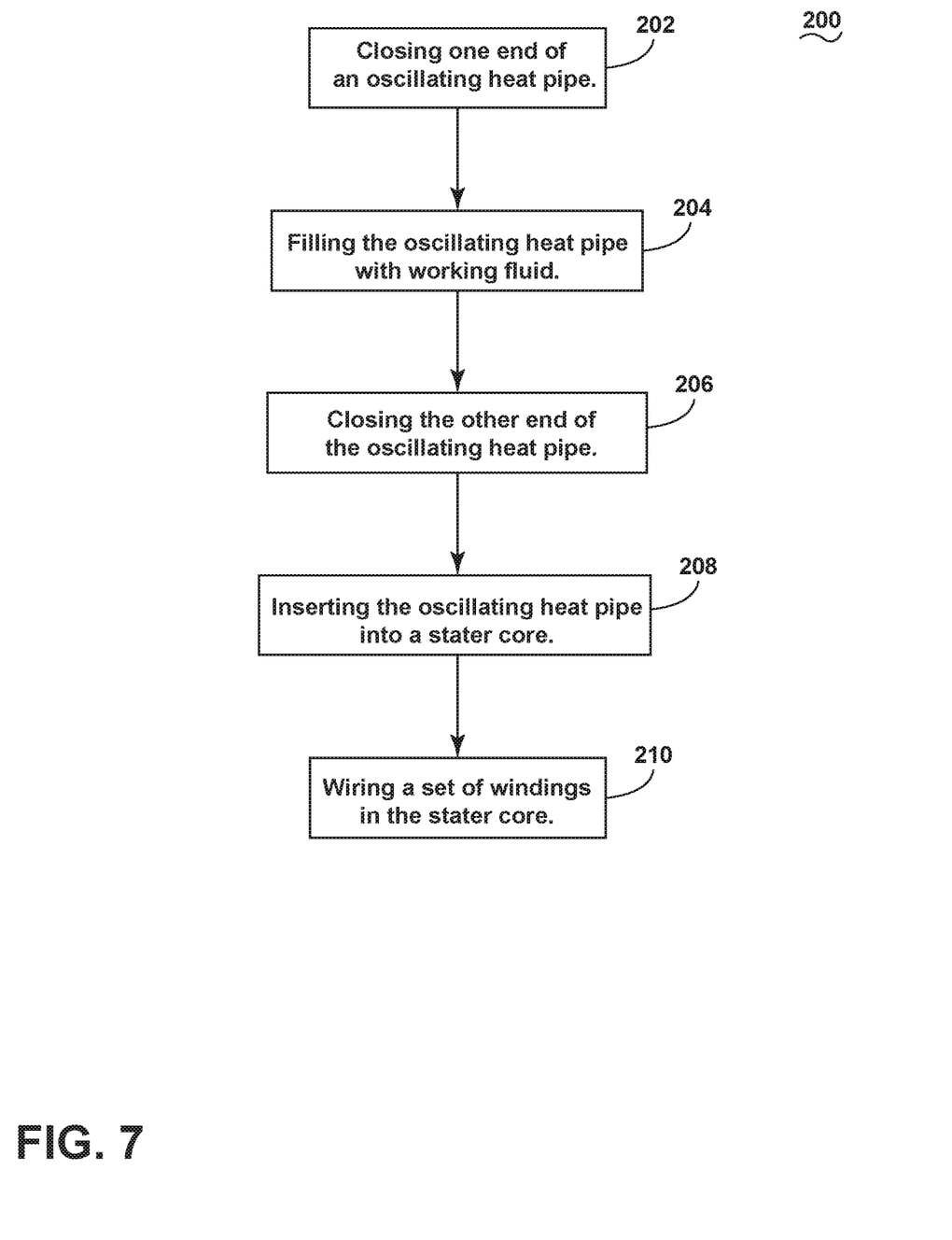
FIG. 7 is a flowchart illustrating a method of assembling the stator of the main machine, in accordance with embodiments of the disclosure.

FIG. 7 illustrates a method 200 for assembling a stator core according to the embodiments of the disclosure. The method 200 begins by closing one end of at least one oscillating heat pipe 114, such as in the set of stator windings 90, at 202. Next, the method 200 proceeds to filling the at least one oscillating heat pipe 114 with a working liquid 120 in alternating phases to a predetermined ratio of fluid volume to total volume at 204. The method continues by closing the other end, or another end, of the at least one oscillating heat pipe 114 at 206. Next, the method 200 includes inserting the filled at least one oscillating heat pipe 114 into a stator core 54 at 208. Finally, the method 200 includes wiring a set of windings 90, for example, including the oscillating heat pipe 114 into the stator core 54 in a two-pole configuration wherein the set of windings 90 surrounds only an evaporator portion 104 of the at least one oscillating heat pipe 114, leaving a condenser portion 106 exposed to a fluid port 87 or nozzle in the rotor 52.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

Although the above embodiments have been described in terms of an S/G for a gas turbine engine, the above-described embodiments of the oscillating heat pipe can be used in any electric machine to significantly increase the stator or rotor cooling capability. The above-described embodiments of the disclosure can be well-suited for certain S/G applications, such as a two-pole generator (e.g. two stator poles and two rotor poles) positioned proximate to the turbine engine, and thus creating a high temperature and space or volume-limited environment for generator operation. In this example, the two-pole generator can be configured such that the axial length of the wet cavity generator is significantly longer than the diameter of the stator core.

Many other possible embodiments and configurations in addition to that shown in the above figures are contemplated by the present disclosure. For example, the set of stator windings can include one or more sequentially connected oscillating heat pipes, wherein the set of stator windings are electrically connected with a solid winding section between the heat pipes. Additionally, the design and placement of the various components can be rearranged such that a number of different in-line configurations could be realized.

The embodiments described above provider for a variety of benefits including that they have higher efficiency, high reliability, less maintenance, all-attitude operation, and lower weight. By attaining increased cooling capabilities for the wet cavity electric machine free of cooling systems external to the machine other than exposing the end turns to the liquid coolant passing through the channel, the electric machine can eliminate the additional the costs, complexity, weight, and size requirements of the additional cooling systems otherwise needed. The resulting electric machine is lighter, smaller, and has less complexity than conventional wet cavity machines. Such a weight reduction is important in a turbine engine environment and provides a competitive advantage during flight. The reduced complexity can also correspond to reduced maintenance over time, also providing lower operating costs.

To the extent not already described, the different features and structures of the various embodiments can be used in combination with others as desired. That one feature cannot be illustrated in some of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a stator core, comprising:
closing one end of at least one oscillating heat pipe;
filling the at least one oscillating heat pipe with a working fluid in alternating phases to a predetermined ratio of fluid volume to total volume;
closing another end of the at least one oscillating heat pipe;
inserting the filled at least one oscillating heat pipe into a stator core; and
wiring a set of windings into the stator core in a two-pole configuration wherein the set of windings surrounds only an evaporator portion of the at least one oscillating heat pipe, leaving a condenser portion exposed to a nozzle in a rotor.

2. The method of claim 1 wherein the inserting includes inserting at least ten segments of a single contiguous oscillating heat pipe into the stator core.

3. The method of claim 1 wherein the filling include filling the at least one oscillating heat pipe to a predetermined ratio of fluid volume to total volume between 15 to 60%.

4. The method of claim 1 wherein the oscillating heat pipe is further received within the set of windings.

5. The method of claim 1 wherein filling the at least one oscillating heat pipe includes filling the at least one oscillating heat pipe with the working fluid in alternating liquid and vapor phases.

6. The method of claim 1 further comprising spraying liquid coolant from the nozzle in the rotor toward the at least one oscillating heat pipe.

7. The method of claim 6 wherein the liquid coolant is sprayed from the nozzle in the rotor toward the condenser portion of the at least one oscillating heat pipe.

8. The method of claim 7 wherein spraying liquid coolant toward the condenser portion of the at least one oscillating heat pipe extracts heat from the condenser portion of the at least one oscillating heat pipe.

9. The method of claim 8 wherein the liquid coolant is oil.

10. The method of claim 7 wherein extracting heat from the working fluid in alternating phases in the condenser portion of the at least one oscillating heat pipe causes the working fluid in alternating phases to oscillate and extract heat from the stator core.

11. The method of claim 10 wherein the exposure of the condenser portion to liquid coolant extracts enough heat from a wet cavity machine having the stator core to enable wet cavity machine to operate within a set of predetermined parameters free of a cooling system external to the wet cavity machine.

12. The method of claim 11 wherein the wet cavity machine is at least one of a power generation system or a starter generator.

13. The method of claim 1 wherein wiring the set of windings into the stator core includes positioning the condenser portion extending axially past the stator core to form end turns.

14. The method of claim 1 wherein filling includes filling the at least one oscillating heat pipe to a ratio of fluid volume to total volume within a range of 15-60%.

15. The method of claim 1 wherein the at least one oscillating heat pipe has a quadrilateral cross section with an internal fluid channel.

16. The method of claim 1 wherein wiring the set of windings includes wiring a plurality of turns in the at least one oscillating heat pipe including a plurality of evaporator portions and a plurality of condenser portions.

17. The method of claim 1 wherein the working fluid is water.

18. A method of operating a power generation system, comprising:
rotating a rotor having at least one nozzle relative to a stator core wound with a set of stator windings having at least one oscillating heat pipe received within the set of stator windings, the at least one oscillating heat pipe having an evaporator portion extending through the stator core and a condenser portion extending axially past the stator core proximate to the at least one nozzle, and wherein the evaporator portion and the condenser portion are positioned between sealed opposing ends of the at least one oscillating heat pipe; and
thermally exposing the condenser portion of the at least one oscillating heat pipe to a liquid coolant passing through the at least one nozzle;
wherein the exposure of the condenser portion to the liquid coolant will extract enough heat from the power generation system to enable the power generation system to operate within a set of predetermined parameters free of a cooling system external to the power generation system.

19. The method of claim 18, further comprising filling the at least one oscillating heat pipe with a working fluid in alternating phases to a predetermined ratio of fluid volume to total volume prior to winding the set of stator windings about the stator core.

20. The method of claim 19 wherein thermally exposing the condenser portion of the at least one oscillating heat pipe to the liquid coolant from the at least one nozzle causes the working fluid to oscillate within the at least one oscillating heat pipe between the evaporator portion and the condenser portion, extracting heat from the stator core.

* * * * *